Patented May 12, 1942

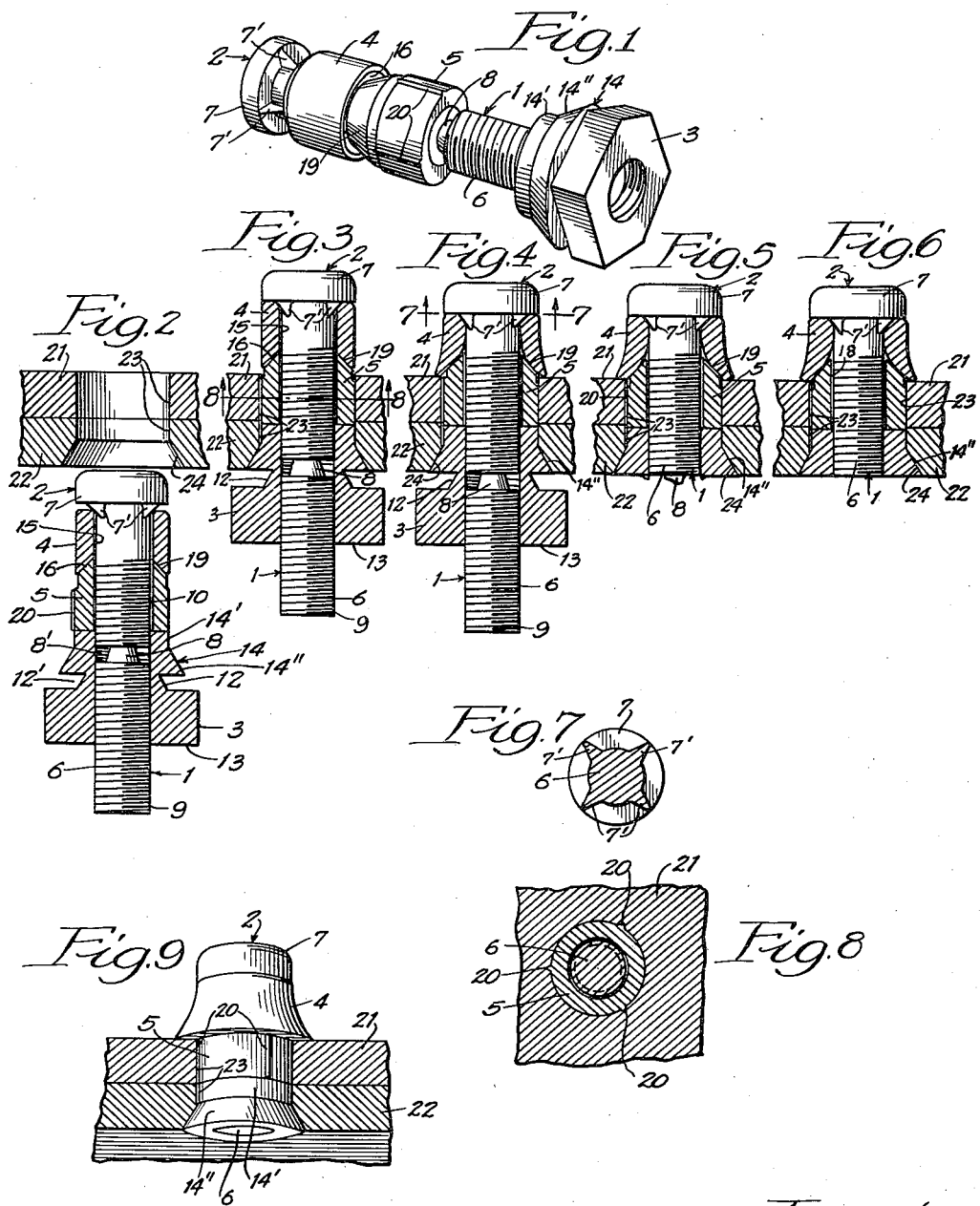

2,282,711

UNITED STATES PATENT OFFICE 2,282,711

RIVET

Howard J. Eklund, Chicago, Ill.

Application November 14, 1940, Serial No. 365,628

5 Claims. (Cl. 85—1)

This invention relates generally to the riveting art and more especially to expansion bolts and the like adapted for such purposes. Its special field is in the construction and repair of closed hollow chambers such as tanks, boilers and such devices, though not limited thereto.

The main objects of my invention are to provide an improved technique, method and means for clamping or riveting operations and more especially to provide better means for clamping or riveting seams, sheet metal patches and the like where access is limited to one face of the work or to the outside of an enclosure or container and a special object is to provide also for flush finish work of this kind.

A further object is to provide a clamping screw device with expansion bolt features and to specially form and design the bolt and nut, with restricted neck parts duly correlated according to needs, so as to permit twisting off the projecting parts by excess wrench torque when the clamp is duly set.

It is also an object of my invention to provide such clamping means or expansion bolts adapted to serve substantially as or in place of rivets.

My invention is illustrated by the accompanying drawing in which:

Figure 1 is a perspective view of one type of my expansion bolt or clamp unit as a whole with its special nut and accessories thereon.

Fig. 2 is an axial section through said unit positioned adjacent to a two-plate piece of work to be clamped or riveted, also shown in axial section through the bolt hole.

Fig. 3 is similar to Fig. 2, except that the bolt has been inserted in the hole ready for setting the expansion member by tightening the nut.

Fig. 4 is similar to Fig. 3, except that the expansion member under the bolt head has been flared and set by nut pressure acting through the intermediate mandrel.

Fig. 5 is taken like Fig. 4 but shows the appearance immediately after twisting off the protruding end of the bolt together with the wrench receiving part of the nut, as provided for at the respective neck parts, leaving the conical part of the nut set in place on the bolt.

Fig. 6 represents the finished work viewed as in Fig. 5, but with the rough faces of the bolt and nut smoothened off flush with the face of the work.

Fig. 7 shows a cross section through the bolt on the line 7—7 of Fig. 4.

Fig. 8 shows a cross section through the work and bolt unit as a whole on the line 8—8 of Fig. 3.

Fig. 9 is a perspective view of the expansion bolt and accessories in the form it assumes in a piece of riveted work, two plates being here shown in section in clamped condition.

Referring more in detail to the drawing, the rivet or expansion bolt 1 as a whole comprises a bolt proper 2, a special nut 3, an expansion sleeve 4, and a cylindroidal mandrel 5 disposed coaxially with said sleeve on shank 6 of said member 2.

This bolt member or shaft 2 has a head 7 preferably of rounded form and provided on its inner face with spurs 7' to engage the adjacent end face of sleeve 4. The threaded shank 6 of member 2 has medially of its length a narrow part or neck 8 formed preferably by cutting a circular groove 8' as will be understood, whereby the shank is rendered readily frangible at this point as by excess twisting force or torsion such as may result from continued application of force after the nut has been set on the work to be clamped. The end part 9 may thus be broken off, leaving the inner part 10 in clamping tension where it is held by the inner part of the nut as will be explained.

The nut 3 is multiplex in character and is made with a narrow neck part 12 formed by cutting a groove 12' medially of its length providing two parts one of which 13 is relatively large and formed as a polygonal head to receive a wrench, and the other part 14 being formed with a cylindrical shank 14' and a small conoidal head 14" adjacent the groove 12'. By reason of this construction with the frangible neck 12 the head 13 may, in effect, be sheared off readily, by continued application of wrench torque after the nut has been set, particular reference being had to the setting of the inner part 14 on the inner part 10 of the bolt shank 6.

The expansion sleeve 4 is of malleable metal or the like; and having a plain bore 15 it fits freely on the screw shank 6. Its inner end (lower in Figs. 2 to 6) is bell-flared interiorly somewhat as at 16 so as to readily admit the mandrel 5 as will be explained.

When in due course pressure is applied to the clamp, as by tightening nut 3, the upper end of sleeve 4 is engaged by the bolt teeth or spurs 7', whereby relative turning at this point is prevented.

The cylindroidal mandrel or wedge 5 has a plain bore 18 and also fits freely on said shank 6, but is intended to fit snugly in the work bore 23 as hereinafter referred to. It is conically beveled at its forward end as at 19 to enter the expansion sleeve 4, and it has outward longitudinal fins 20 to engage the work (21—22) and prevent turning.

Operation

The method of using the expansion bolt or rivet herein described is to assemble the work, as for instance two steel plates 21 and 22. These have been appropriately drilled as at 23 and countersunk on the outer side of the works, as at 24 on Fig. 2. Then insert a bolt or rivet unit 1 such as shown in Figs. 1 and 2 into and through the hole 23 where it seats with the conical flange or head 14″ of nut member 14 fitting in the countersink 24.

The sleeve 4 is designed for somewhat over a snug fit in the hole 23 so that when it has assumed the position shown in Fig. 3, the inner edges tend to bear somewhat against the adjacent face of the work and so that when the nut 3 is tightened, the shank 6 preferably held by any appropriate means against turning, the reaction of sleeve 4 against the abutting conical face 19 of the tightly set mandrel 5 (in bore 23) will serve to expand the end of sleeve 4 so as to bear resistantly against the inner face of the work, as in Figs. 4, 5 and 6.

Further tightening of nut 3 forces the mandrel 5 and sleeve 4 still further into telescope relation as in Fig. 5 whereby the sleeve 4 is necessarily expanded at its inner end until it assumes a positively well-seated position on the face of the work. As a result of this the head end of the bolt proper 2, bearing on sleeve 4, is permanently seated or anchored against withdrawal. Whereupon, the nut 3, having been set tightly in place as shown at 14″—24 on Fig. 4—and the inner end thereof having its outer face substantially flush with the corresponding face of the work, according to design and choice of bolt units, further turning by forcible wrench action serves to shear off the outer parts 13 and 9 of the nut and bolt shank by twisting torque, as will be understood. It then remains only to apply a finishing tool to smooth up the face of the work, whereupon the job is finished, as in Fig. 6.

Conclusion

Consistently with the foregoing and pursuant thereto, it is now apparent that the invention resides broadly in the concept of a uniform smooth finish expansion bolt job for "riveting" enclosures, preferably with a flush face, and more specifically in novel bolt and nut feature adapted to accomplish these results.

Here the invention lies largely in the shape, construction and operation of the nut for providing a flush countersunk finish when the rivet has been finally set and polished off; and also in the relative location or designed registry of nut and bolt necks, so that when the head sleeve has been properly expanded and set, the outward end faces of the main bolt part and the inner nut part are in exact alinement ready for breaking off the projecting parts flush with the surface of the outer plate. In this regard it should be noted that these devices may be manufactured to size according to order so as to fit exactly, according to need, the thickness of the plates in which they are to be driven and set.

It is to be understood that some of the details set forth may be altered or omitted without departing from the spirit of my invention as defined by the following claims.

I claim:

1. A fastening device consisting of a nut comprising two body parts disposed endwise coaxially and connected by a frangible neck part, and a headed bolt having a shank threaded to fit said nut and having a frangible portion intermediate the ends of its threaded part.

2. In a device of the class described, a nut comprising two body parts disposed endwise coaxially and connected by a frangible neck part, one of said body parts being tapered for seating in a countersunk hole, and the other being formed for engagement with a turning tool and a shaft threaded to fit said threaded bore of said nut and having a reduced frangible neck portion intermediate the ends of the thread of said shaft.

3. A device comprising a threaded shaft, with a head on one end to pass through the work to be clamped, an expandable sleeve on said shaft to bear against said head, a nut to engage the other end of said shaft and bear inward forceably against the work, and a cylindroidal wedge interposed between said sleeve and said nut, said wedge having a tapered end to wedgingly enter and expand the adjacent end of said sleeve so as to seat the latter against the adjacent face of the work, and said shaft and nut each having a frangible neck-connected outer end part adapted to be twisted off by continued torque when said nut has been duly set to clamp the work.

4. A device for clamping use, comprising a threaded shaft, with a head on one end to pass through the work to be clamped, an expandable sleeve on said shaft to bear against said head, a conoidal nut to engage the other end of said shaft and bear inward forceably against the work, and cylindroidal wedge interposed between said sleeve and said nut, said wedge having a tapered end to wedgingly enter and expand the adjacent end of said sleeve so as to seat the latter against the face of the work, said nut having a conoidal inner part to seat on a corresponding face part of said work, and said shaft and nut each having an outer end part frangibly connected thereto respectively and adapted to be twisted off by continued torque when said nut has been effectively set.

5. A clamp comprising a threaded shaft having a head and having a shear neck in its shank, in combination with an expansible sleeve next to the head, a cylindrical mandrel next to said sleeve to expand the latter under pressure and a nut next to said mandrel, said nut having a shear neck with a turning tool receiving head on its outer end and a head on the other end to bear against the said mandrel and the work.

HOWARD J. EKLUND.